(12) United States Patent
Immink et al.

(10) Patent No.: US 7,612,948 B2
(45) Date of Patent: Nov. 3, 2009

(54) CONTROLLABLE OPTICAL LENS

(75) Inventors: Albert H. J. Immink, Eindhoven (NL); Bernardus H. W. Hendriks, Eindhoven (NL); Stein Kuiper, Vught (NL); Ivon F. Helwegen, St. Odilienberg (NL); Marco A. J. Van As, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 390 days.

(21) Appl. No.: 10/599,353

(22) PCT Filed: Mar. 29, 2005

(86) PCT No.: PCT/IB2005/051055

§ 371 (c)(1),
(2), (4) Date: Sep. 26, 2006

(87) PCT Pub. No.: WO2005/096035

PCT Pub. Date: Oct. 13, 2005

(65) Prior Publication Data
US 2008/0239502 A1 Oct. 2, 2008

(30) Foreign Application Priority Data
Mar. 30, 2004 (EP) ................................. 00407240

(51) Int. Cl.
*G02B 1/06* (2006.01)
(52) U.S. Cl. ........................ 359/666; 359/665; 359/900

(58) Field of Classification Search ................. 359/665, 359/666, 696–698, 721, 820, 823, 245, 250, 359/253, 900
See application file for complete search history.

(56) References Cited

U.S. PATENT DOCUMENTS

| 5,182,585 | A | 1/1993 | Stoner et al. | |
|---|---|---|---|---|
| 6,369,954 | B1 | 4/2002 | Berge et al. | |
| 6,806,988 | B2 * | 10/2004 | Onuki et al. | 359/253 |
| 7,245,439 | B2 * | 7/2007 | Kuiper et al. | 359/665 |
| 2003/0006140 | A1 | 1/2003 | Vacca et al. | |

FOREIGN PATENT DOCUMENTS

WO          03069380 A1    8/2003

OTHER PUBLICATIONS

ISR, The Written Opinion of the International Searching Authority PCT/IB2005/051055.

* cited by examiner

*Primary Examiner*—Jack Dinh

(57) ABSTRACT

A controllable optical lens system, comprises a chamber housing first and second fluids, the interface between the fluids defining a lens surface. An electrode arrangement controls the shape of the lens surface and has first and second electrodes. A parameter is determined by the system dependent on the electrical resistance through at least one of the lens fluids between the first and second electrodes. Thus, the series resistance through a lens fluid is used as a measure of meniscus position.

23 Claims, 5 Drawing Sheets

CONTROLLABLE OPTICAL LENS

This invention relates to a controllable optical lens, in particular using the so-called electrowetting principle (also known as electrocapillarity).

An electrowetting lens comprises a chamber housing two non-miscible fluids, such as an electrically insulating oil and a water based conducting salt solution, and the meniscus between these fluids defines a refractive index boundary and therefore performs a lens function. The shape of the meniscus is electrically controllable to vary the power of the lens. The fluid may comprise a liquid, vapour, gas, plasma or a mixture thereof.

The electrical control of the lens shape is achieved using an outer annular control electrode, and the electrowetting effect is used to control the contact angle of the meniscus at the outside edge of the chamber, thereby changing the meniscus shape.

The basic design and operation of an electrowetting lens will be well known to those skilled in the art. By way of example, reference is made to WO 03/069380.

Electrowetting lenses are compact and can provide a variable focusing function without any mechanical moving parts. They have been proposed in various applications, particularly where there are space limitations and where power consumption is to be kept to a minimum, for example use as an autofocus camera lens in a mobile phone.

It has been recognised that sensing the lens condition is desirable, to provide a feedback control function. Due to slow charging of the insulator (between the electrodes and the fluids) the relation between the voltage and the exact position of the oil-water meniscus is subject to drift, and a feedback system can compensate for this. If a zoom lens is implemented with multiple variable lenses, it may not be possible to uniquely derive the lens characteristics from optical measurements through the multi-element lens system. It is also therefore desirable to be able to measure the shape of each individual meniscus in such a system.

A conventional electrowetting lens has a bottom electrode and a circumferential wall electrode. It has been proposed that the capacitance across the electrodes can be measured to provide feedback about the shape of the lens. In particular, the shape and the position of the meniscus changes when a voltage is applied, so that the effective size of the annular electrode changes (the effective size depends on the area of water in contact with the electrode, which changes, as the meniscus position changes). A resulting change in capacitance can be measured, and this capacitance has been considered to be a reasonably accurate parameter for measuring the strength of the lens.

The use of measured capacitance to determine the lens position requires the thickness and dielectric constant of the insulating coating to be known. This thickness may be subject to variations form batch to batch.

According to the invention, there is provided a controllable optical lens system, comprising:
 a chamber housing first and second fluids, the interface between the fluids defining a lens surface;
 an electrode arrangement for electrically controlling the shape of the lens surface, the electrode arrangement comprising first and second electrodes; and
 means for determining a parameter dependent on the electrical resistance through at least one of the lens fluids between the first and second electrodes.

The invention is based on the recognition that the resistance in series with the lens capacitance will also change in response to lens power due to the fact that the conducting liquid changes shape. Thus, the series resistance can also be used as a measure of meniscus position.

The means for determining may be for determining an electrical capacitance and resistance between the first and second electrodes. Thus, resistance information may be used to supplement capacitance information.

The means for determining may comprise an ac power source and means for analysing the current supplied by the ac power source. This enables the derivation of the temporal response of the current through the lens in reaction to an ac stimulus. The temporal response is dependent on both the capacitance and resistance across the lens electrodes. A relatively small ac power source signal may be used, superposed onto the dc drive voltage of the lens.

The means for determining may further comprise a first resistor in series between the power source and one of the first and second electrodes, wherein the means for analysing the current supplied by the ac power source analyses the voltage drop across the first resistor.

This analysis may yield a time constant for the response of the system.

In a further embodiment, the means for determining further comprises a second series resistor which is selectively switched into circuit with the first resistor. This enables first and second time constants to be determined for the response of the system with and without the second series resistor. In turn, the resistance and capacitance values can be derived from two time constants.

The invention also provides a method of sensing the lens position of a controllable optical lens, the lens comprising a chamber housing first and second fluids, the interface between the fluids defining a lens surface, and an electrode arrangement for electrically controlling the shape of the lens surface, the electrode arrangement comprising first and second electrodes, wherein the method comprises:
 determining a parameter dependent on the electrical resistance through at least one of the lens liquids between the first and second electrodes; and
 using the parameter to determine the lens surface position.

This method uses the resistance as the, or an additional, parameter in providing feedback concerning the lens meniscus position.

Determining the parameter may comprise determining a charging time constant for the lens, or determining two charging time constants for the lens, one with and without an additional known resistance. In this case, the lens capacitance and resistance can be derived from the two time constant measurements.

The feedback can be obtained using an AC probe voltage, or the superposition of a DC voltage and a lower voltage square wave AC voltage.

The time constant can be obtained by a best fit analysis and/or using a look up table.

Examples of the invention will now be described in detail with reference to the accompanying drawings, in which.

Figure 1:
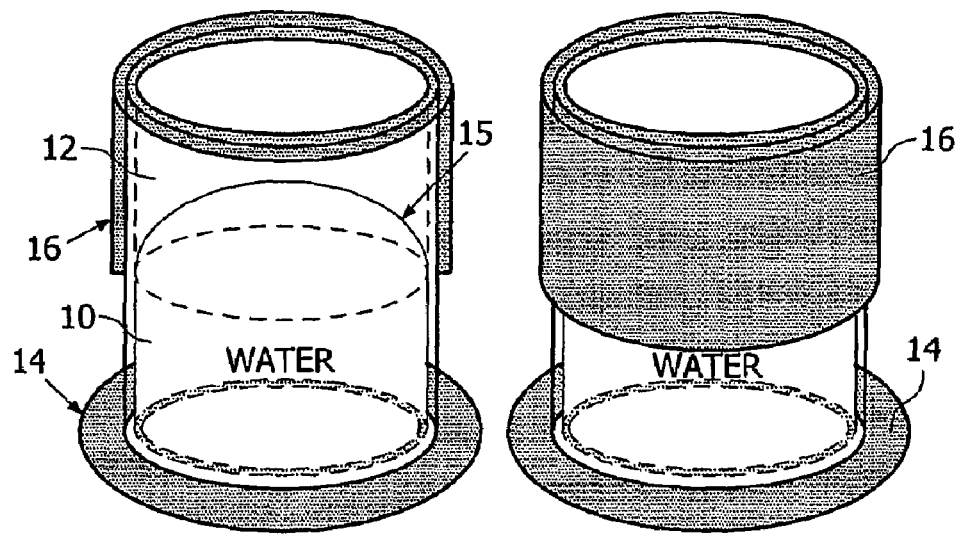
FIG. 1 shows a known design of electrowetting lens.

FIG. 1 schematically shows a known electrowetting lens design. The left part of FIG. 1 shows the interior of the lens. The lens comprises a chamber which houses a polar and/or conductive liquid such as a salted water based component 10 (referred to below simply as the water) and a nonconductive liquid such as an oil based component 12 (referred to below simply as the oil). A bottom electrode 14 and a circumferential side electrode 16 control the power of the lens. The side electrode is separated from the liquid by an insulator which forms the side wall of the chamber, and this insulator acts as a capacitor dielectric layer during electrical operation of the lens. This operation will be well known to those skilled in the art, and reference is made to WO 03/069380.

The invention provides a controllable optical lens system, in which the electrical resistance through the lens between the first and second electrodes is used to provide a lens power feedback function.

Figure 2:
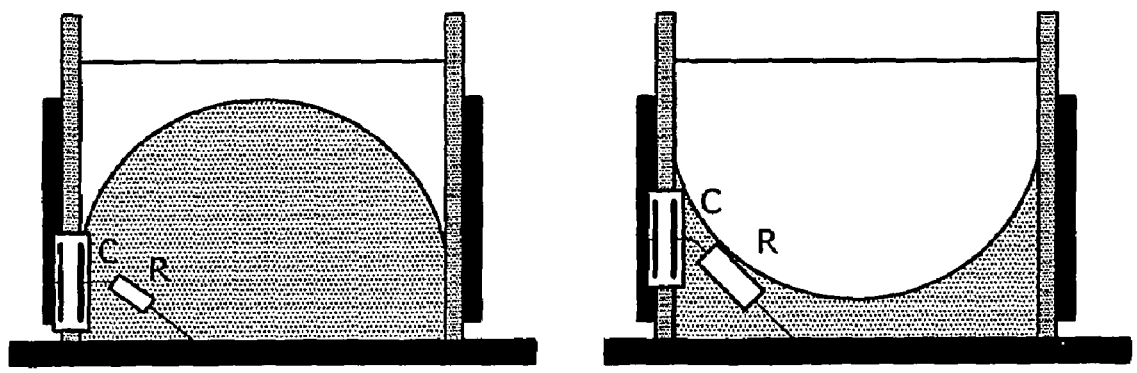
FIG. 2 shows how resistance through the lens liquid varies with meniscus position.

FIG. 2 shows schematically how the lens shape changes the resistance. In FIG. 2, both R and C increase when the lens position is is changed from that in the left part of the Figure to that in the right part of the Figure. Typical resistance values of the liquid for a lens with a diameter of approximately 1 cm are 500Ω (a typical liquid is for example 0.1 M KCl in water). The resistance of the liquid may be much lower if a higher salt concentration is provided, for example to prevent the liquid from freezing.

The current practical situation is somewhat more complicated due the fact that the electrodes of the electro-wetting lens are ITO layers with a considerable resistance, also in the order of 500Ω. To reduce the electrode resistance, metal electrodes may be employed, at least for the side wall electrode which is not in the light path.

One possible implementation of the invention is therefore simply to measure the lens resistance, and this could be performed with a simple dc analysis.

However, instead of simply measuring resistance, a combined resistance and capacitance measurement can be performed, and this is equivalent to performing a complete impulse response measurement. The detailed examples of the invention set out below use measurements which depend both on the resistance and capacitance of the lens.

One possibility is to directly drive the electro-wetting lens with a square wave voltage and measure the current waveform (for example by converting the current waveform to a voltage waveform) and sample this by an analogue to digital converter and process this signal further digitally.

Figure 3:
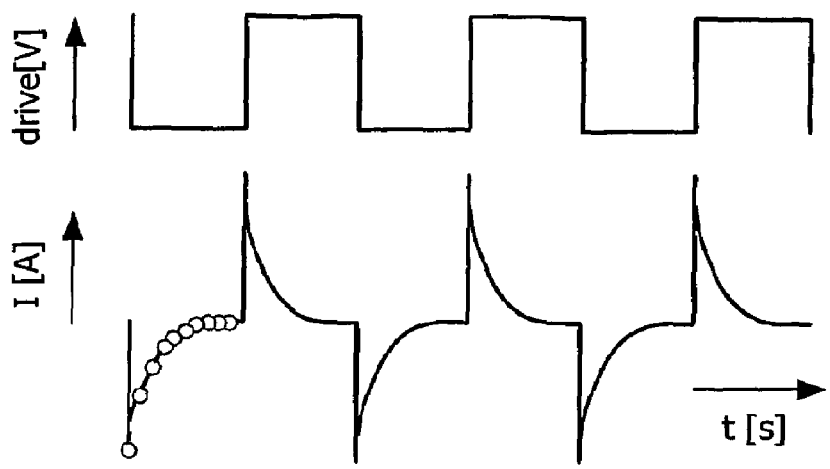
FIG. 3 shows a first example of measurement of the invention.

FIG. 3 shows how sampling of the current waveform in response to an ac probe signal can be used to derive information concerning the time constant of the lens, which depends on the product of the resistance and capacitance.

In case of a square wave voltage, the RC time constant leads to an exponential signal shape for the current with a time constant $\tau$=RC as indicated in FIG. 3. A sinusoidal voltage can instead be applied as the ac voltage. In this case, the phase relation between the voltage and the induced current can be used to determine the RC time constant. It will be clear to a person skilled in the art that there are more ways to determine RC values.

In case of a square wave voltage, the circles in FIG. 3 indicate a is possible sampling of the curve to be able to measure the impulse response of the lens. From this impulse response measurement, more accurate information can be derived about the actual lens position.

The RC time constant can provide a unique relationship to the lens position, particularly when they increase or decrease together, as schematically shown in FIG. 2. Thus, a simple time constant measurement as above will suffice. This can, as one of various possible embodiments, be achieved by sampling the voltage drop across a known resistance $R_m$ placed between the ac power source and the lens.

However, it may also be desirable to distinguish between the values of R and C, and this can be achieved by repeating the measurement after adding a small and accurately known resistor $R_s$, in series with the electro-wetting lens.

The time constant then will be $\tau'=(R+R_s)C$. The capacitance C can then be calculated as $C=(\tau'-\tau)/R_s$ and the value R of the electro-wetting lens can also be calculated.

Figure 4:
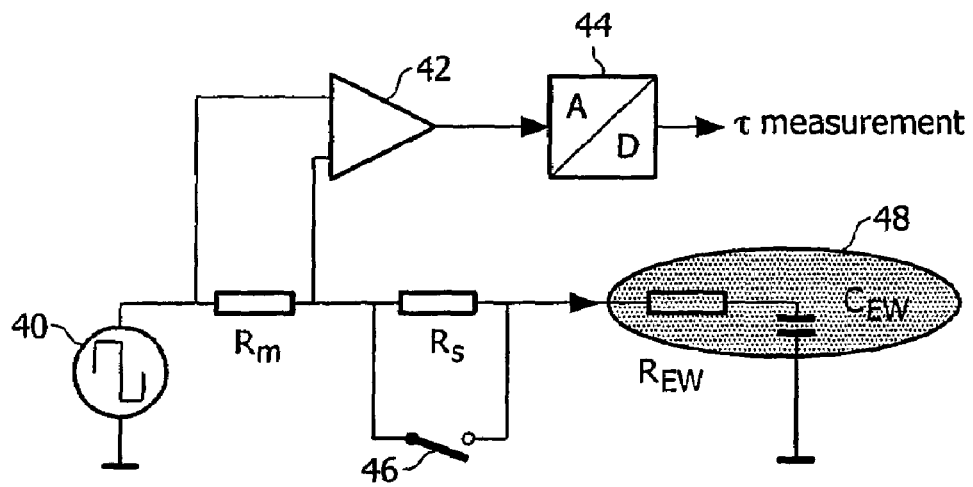
FIG. 4 shows a circuit in a lens system of the invention.

FIG. 4 shows a system for implementing this approach. The system has an ac power source 40, and the output is provided to the lens through a measurement resistor $R_m$ and an additional series resistor $R_s$. The voltages on the terminals of the measurement resistor $R_m$ are monitored by differential amplifier 42 which enables an instantaneous current measurement to be obtained. The current profile is analysed after A/D conversion by converter 44, which then enables the time constant to be obtained.

The additional series resistor $R_s$ is selectively switched into or out of circuit by a shorting switch 46. FIG. 4 shows the lens 48 having series resistance $R_{EW}$ and capacitance $C_{EW}$.

Figure 5:
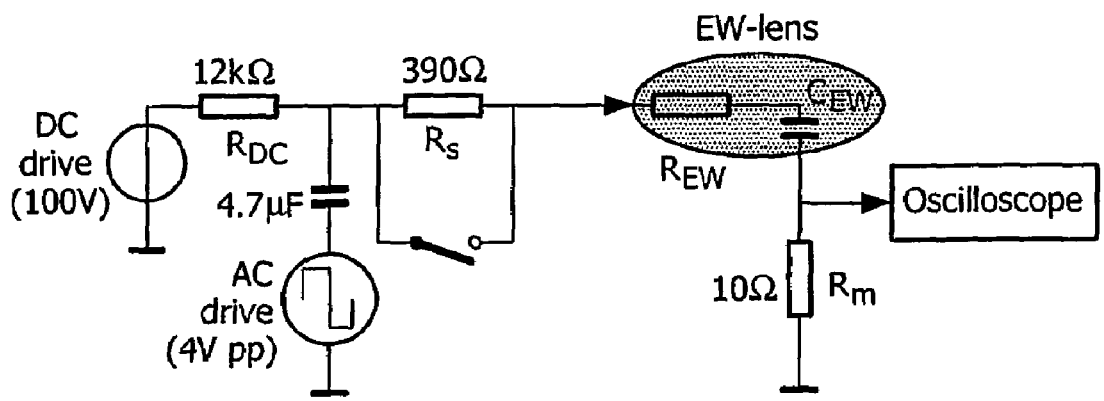
FIG. 5 shows an experimental implementation of the circuit of FIG. 4 for producing the results of FIGS. 6 to 9.

FIG. 5 shows an experimental implementation of the circuit of FIG. 4. The lens in this experimental setup was measured using a network analyzer. It was found that the lens can be best modeled as a series connection of a resistor of approximately 735Ω and a capacitor of 69 pF. The values of the other components are shown in FIG. 5. A square waveform with a rise-time of 170 ns was used to provide the experimental results given below. The large series resistor of 12 kΩ is used in the DC supply circuit, to avoid the output impedance of the DC source being measured by the AC voltage instead of the electro-wetting lens. In an actual implementation, the AC drive would be included in the DC supply.

The lens is initially connected in series with the 10Ω measurement resistor only. The exponential decay of current as function of time is measured by measuring the voltage across the measurement resistor $R_m$.

Figure 6:
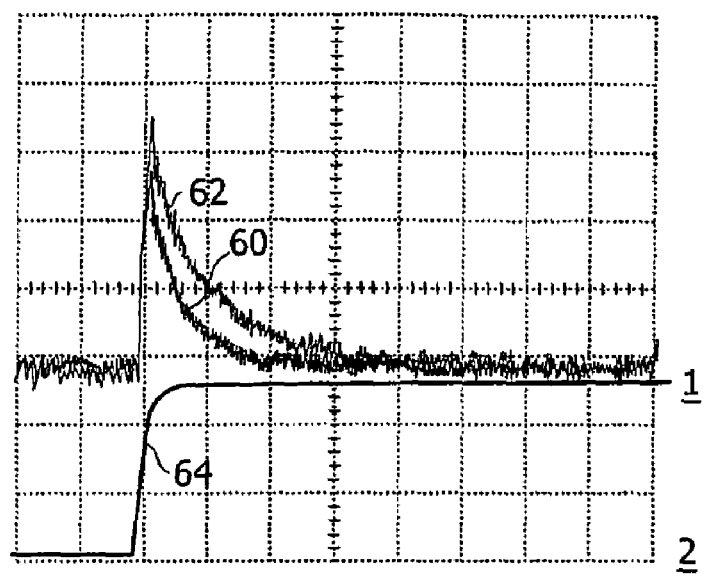
FIG. 6 shows the temporal response for the lens with two different voltage drive conditions.

The result is shown in FIG. 6 for a DC voltage of 0V (plot 60) and a DC voltage of 100V (plot 62). These DC voltages are used to create different meniscus positions. Plot 64 shows the step voltage change provided by the ac source. A clear difference in time-constant can be observed. The time-constant is measured by calculating the logarithm of this curve and fitting the result with a straight line as described by the following equation:

$$\ln(e^{-\frac{t}{\tau}}) = -\frac{t}{\tau}$$

Figure 7:
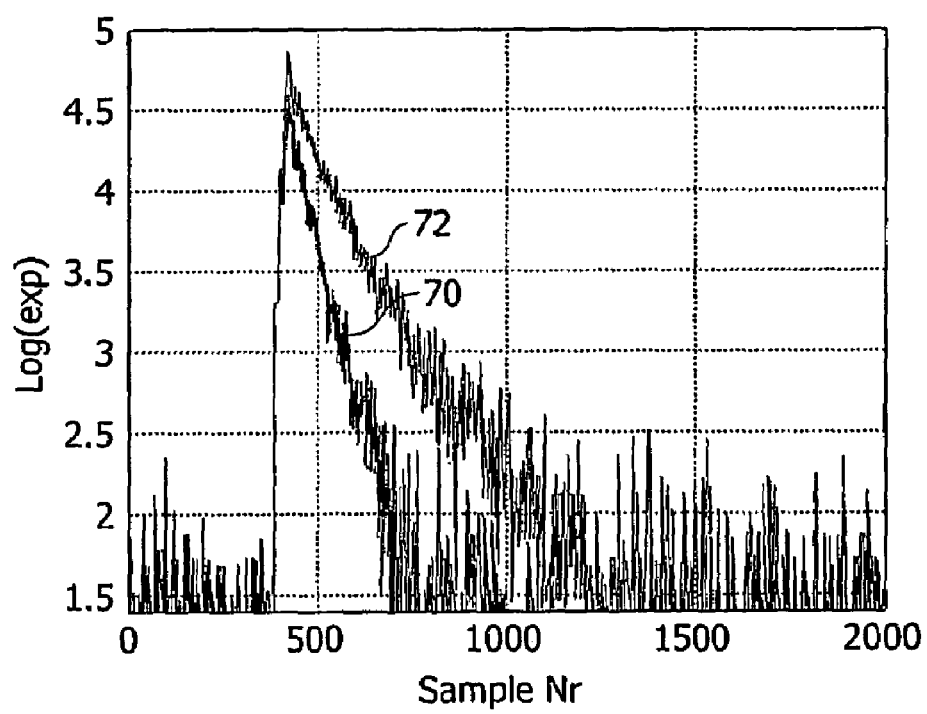
FIG. 7 shows an analysis of the plots of FIG. 6.

A similar procedure can be followed by using a look-up table with the logarithm followed by a simple least square linear fit. The result of the logarithm is shown in FIG. 7, with corresponding plots 70 and 72. The x-axis shows the sample number.

Figure 8:
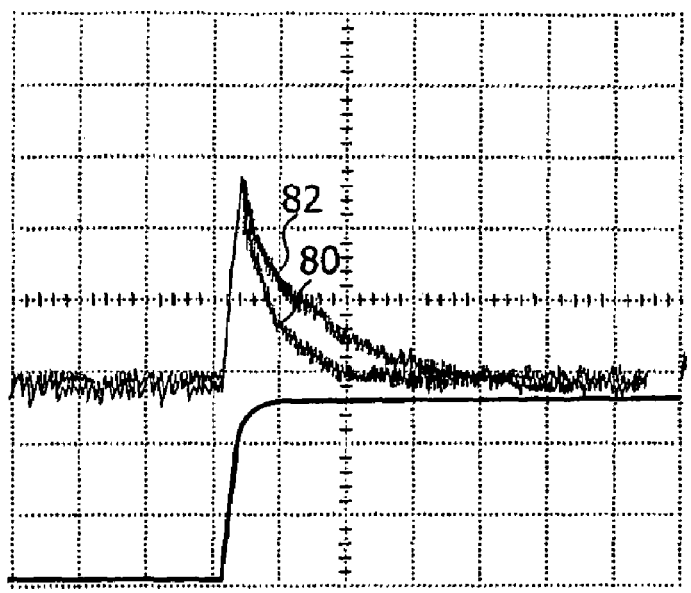
FIG. 8 shows the temporal response for the lens with two different voltage drive conditions and with an additional resistor in circuit.
Figure 9:
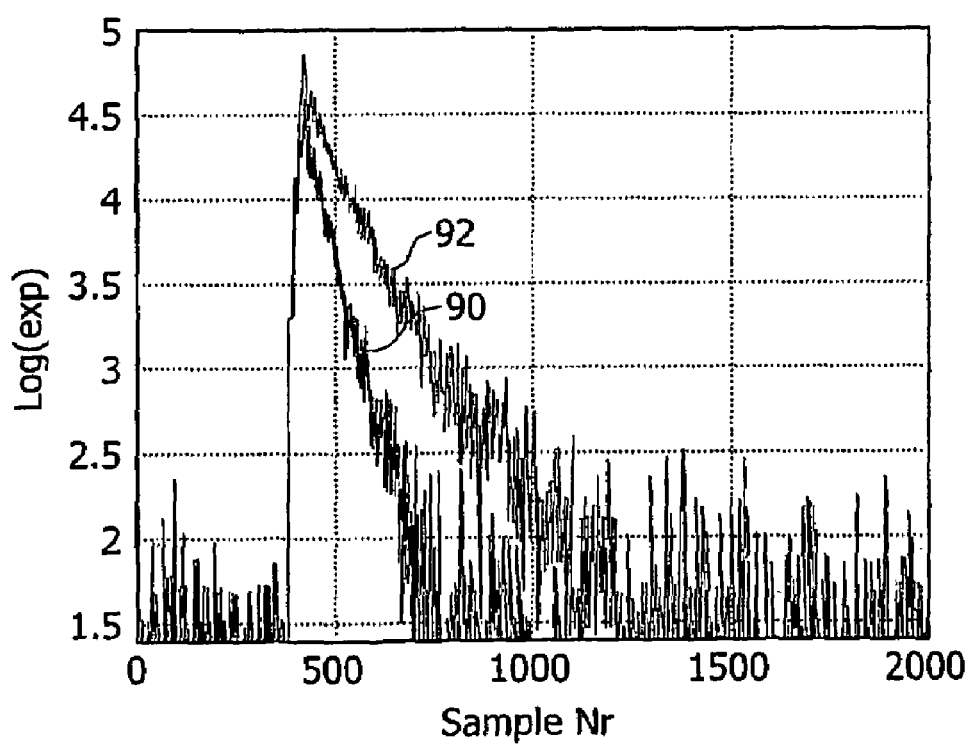
FIG. 9 shows an analysis of the plots of FIG. 8.

The extra series resistor $R_s$ of 390Ω is then added to the circuit. This makes the total external series resistance equal to 390+10=400Ω. The measurement is repeated showing the results as indicated in FIG. 8 and FIG. 9. Again plots 80 and 90 correspond to a 0V dc drive and plots 82 and 92 correspond to a 100V dc drive.

The results are summarized in Table 1.

TABLE 1

Overview of measurement results

| Measurement | Slope | τ [ns] | R [Ω] | C [pF] |
|---|---|---|---|---|
| 0 V; 10 Ω | −0.00905736 | 55.204 | | |
| 0 V; 400 Ω | −0.0062758 | 79.67 | 880 | 62.7 |
| 100 V; 10 Ω | −0.0048818 | 102.42 | | |
| 100 V 400 Ω | −0.0028989 | 172.5 | 570 | 179.6 |

It is clear that at the high voltage (100V) the meniscus is relatively flat and the capacitance is high (179.6 pF) as expected and corresponding to the right part of FIG. 2. In this example, the voltage is sufficiently high to give a concave meniscus.

For the low voltage, the results reflect the left part of FIG. 1 and a low capacitance of 62.7 pF results.

However, for the resistance, the measurements are different to what could be expected. A decrease in resistance is observed for higher voltages where an increase in resistance with higher voltages is expected, as shown in FIG. 2. This discrepancy is attributable to the ITO electrodes 14,16. They have a resistance approximately equal to the liquid of the electro-wetting lens. For a high voltage and a flat or concave meniscus the total area of the liquid that is in contact with the cylinder wall increases leading to a lower resistance. This effect is apparently larger than the effect of the reduced volume of conducting solution near the edges of the cylinder as shown in FIG. 2.

With correct modeling or testing, the effect on the resistance and capacitance of the meniscus position can be known in advance, so that the resistance and capacitance effects can be used to measure the position of the meniscus. The resistance can be used alone or in combination with the capacitance to provide a feedback function.

The effect of the high electrode resistance can also be enhanced so that the reduction in resistance as the electrode area is increased becomes more pronounced. Thus, higher resistance, for example non-metal, electrodes can be used to enhance this effect and thereby make the electrode resistance dominant over the resistance of the conductive lens liquid. For example, the wall electrode may be formed from a higher resistance material than the conducting liquid.

The resulting extra resistance in the electrodes will have an effect on the response time of the lens because of the small capacitance of the lens. The response time of the lens will however be limited by fluid dynamics. When driving the lens with a large symmetrical AC voltage to prevent charging of the lens, this series resistance in the electrodes could however cause unwanted dissipation.

There are therefore numerous ways to use resistance measurements to provide lens power feedback, and different schemes will be appropriate for different electrode and lens materials. The invention is intended to cover any such use of resistance information as a sensing parameter, and this resistance does not necessarily need to be extracted from the parameter, for example the time constant may be obtained without subsequently deriving the resistance value. As an example, information about the time constant can also be derived from the phase relation between a sinusoidal applied voltage and the induced current through the lens by this voltage.

The electrowetting lens described above has a bottom electrode and a circumferential wall electrode. Due to this circular symmetric structure of the lens, aberrations in the shape of the meniscus due to gravity or other effects cannot be compensated for. It is also not possible to measure asymmetric changes in the shape of the meniscus using this electrode configuration.

This invention can also be applied to a lens design having angularly spaced electrode segments. These can be used to determine the local shape characteristics of the lens at different angular positions around the lens. In this way, asymmetry can be detected. With appropriate design of the control electrode arrangement, this detected asymmetry can then be corrected.

Figure 10:
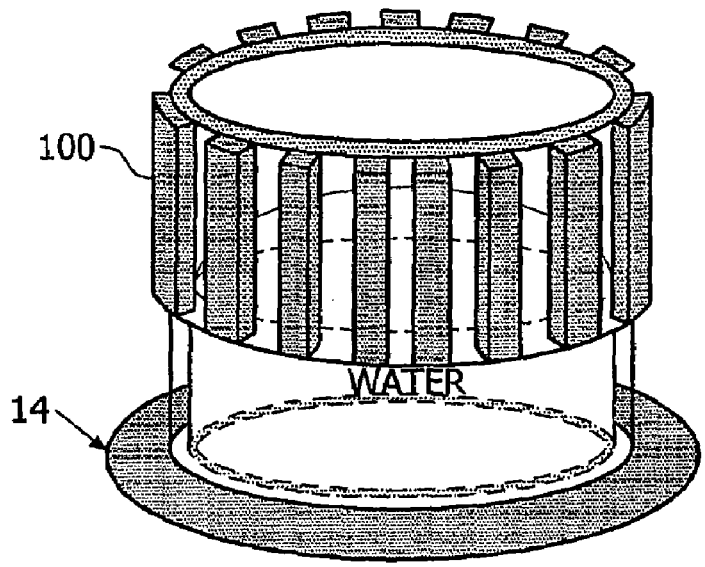
FIG. 10 shows a different lens design which can be used in a system of the invention.

FIG. 10 shows an arrangement in which the wall electrode 16 is split into a number of axial electrodes 100. A resistance (and optionally also capacitance) measurement can then be carried out for the path between each individual axial electrode and the bottom electrode 14.

In this way, for each of the electrodes 100, a measurement with respect to the bottom electrode 14 can be measured independently. This then provides not only information about the global strength of the lens, but also the asymmetric shape of the meniscus.

The segmented side wall electrode also allows each electrode 100 to be driven independently with a driving voltage that is a function of the measured values and the required shape and strength of the lens. When different voltages are applied across the circumference, the angle the liquid will make with the cylinder wall will vary across the circumference leading to a deformation of the meniscus. This can be used to compensate for lens aberrations due to gravity.

Figure 11:
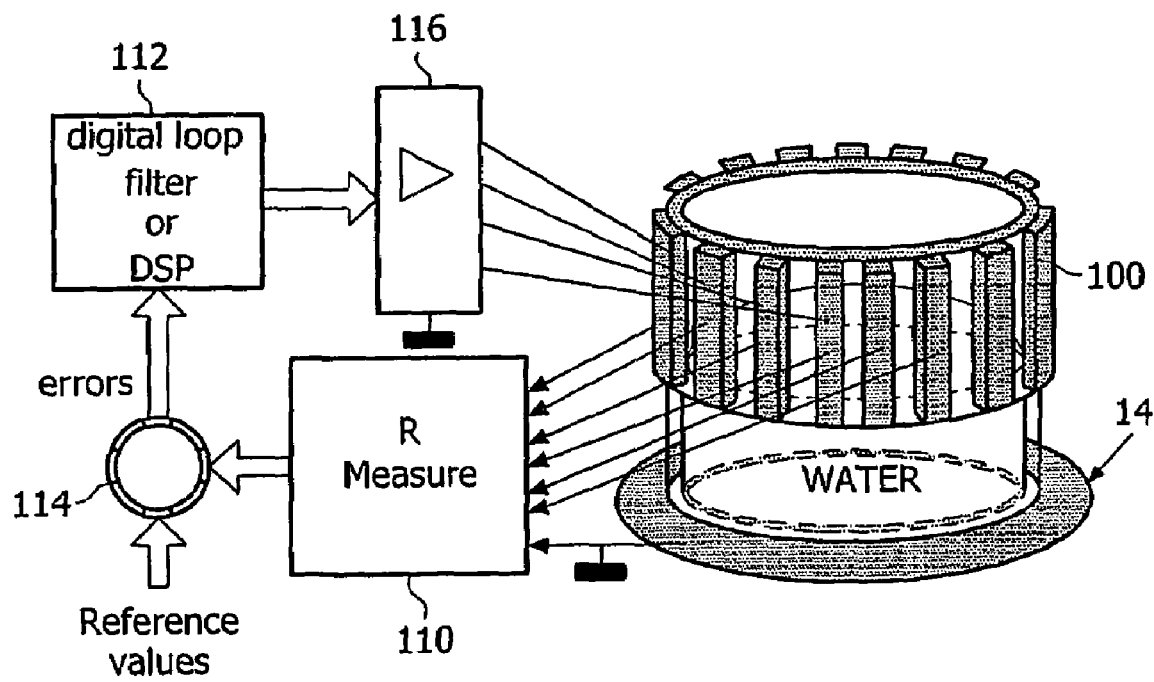
FIG. 11 shows drive and sense circuitry for use with the lens of FIG. 10.

The driving voltages can be calculated continuously such that the aberration is minimized at each orientation of the lens with respect to the field of gravity. A block diagram of a system for implementing this control scheme is shown in FIG. 11.

Each electrode 100 connects to a measurement circuit 110 as described above, to perform the sensing operation. When driving the electrodes 100, the angle of the conducting liquid (water) with the wall of the lens cylinder will vary as function of the voltage. Control of the voltages can be achieved using a loop-filter 112 which receives error values from a comparator 114. The comparator 114 compares the measured values with reference values for the desired optical power. The loop filter can implement a linear control scheme, for example PI (proportional-integral) control using an integrating loop filter. The changes may be relatively slow, so it may also be possible to calculate the voltages with a DSP (digital signal processor) based on the output of the comparison between the measured values and the reference values. In that case it is more easy to apply more sophisticated non-linear control schemes.

Voltage drivers 116 controlled by the filter or DSP provide the drive voltages to the electrodes 100.

The feedback information provided by the invention, in both the single electrode scheme or the segmented electrode scheme, can be used in conventional manner to provide feedback control of the lens power, in the same way that capacitance measurements alone have previously been proposed for this purpose.

Various other modifications will be apparent to those skilled in the art.

The invention claimed is:

1. A controllable optical lens system, comprising:
    a chamber housing first (10) and second (12) fluids, the interface between the fluids defining a lens surface;
    an electrode arrangement for electrically controlling the shape of the lens surface, the electrode arrangement comprising first (14) and second (16) electrodes;
    means for measuring the electrical resistance ($R_{EW}$) through at least one of the lens fluids (10) between the first and second electrodes; and
    means for determining the meniscus position of the lens in dependence upon the measured electrical resistance ($R_{EW}$).

2. system as claimed in claim 1, further comprising means for measuring the electrical capacitance ($C_{EW}$) through at least one of the lens fluids (10) between the first and second electrodes.

3. A system as claimed in claim 1, wherein the means for means for measuring the electrical resistance ($R_{EW}$) through at least one of the lens fluids (10) between the first and second electrodes comprises: an ac power source (40); means (42,44) for analyzing the current supplied by the ac power source.

4. A system as claimed in claim 3, wherein the means for measuring the electrical resistance ($R_{EW}$) through at least one of the lens fluids (10) between the first and second electrodes providing a lens power feedback function further comprises a first series resistor ($R_m$) in series between the power source and one of the first and second electrodes, and wherein the means (42,44) for analyzing a current supplied by the ac power source analyzes the voltage drop across the first series resistor.

5. A system as claimed in claim 4, wherein the means for analyzing is for determining a time constant for the response of the system.

6. A system as claimed in claim 4, further comprising a second series resistor (Rs) which is selectively switched into circuit with the first resistor ($R_m$).

7. A system as claimed in claim 6, wherein the means for analysing is for determining first and second time constants for the response of the system with and without the second series resistor.

8. A system as claimed in claim 7, wherein the time constants are obtained by a best fit analysis.

9. A system as claimed in claim 3, wherein the ac power source signal used for determining is superposed onto the dc power source signal used for driving the lens.

10. A system as claimed in claim 1, wherein the electrode arrangement comprises: a drive electrode arrangement comprising a base electrode (14) and a side wall electrode (16).

11. A system as claimed in claim 10, wherein the side wall electrode (16) comprises an annular electrode which surrounds the chamber.

12. A system as claimed in claim 10, wherein the area of overlap of one of the fluids (10) with respect to the side wall electrode (16) varies in dependence on the lens surface position, and the side wall electrode (16) is formed from a material having a higher resistance than said one of the fluids.

13. A system as claimed in claim 12, wherein the side wall electrode (16) is formed from a non-metal.

14. A system as claimed in claim 1, wherein the first liquid (10) comprises a polar or conductive liquid and the second liquid (12) comprises a nonconductive liquid.

15. A method of sensing the lens position of a controllable optical lens, the lens comprising a chamber housing first and second liquids (10,12), the interface between the liquids defining a lens surface and an electrode arrangement (14,16) for electrically controlling the shape of the lens surface, the electrode arrangement comprising first and second electrodes (14,16), wherein the method comprises:
    means for measuring the electrical resistance ($R_{EW}$) through at least one of the lens fluids (10) between the first and second electrodes; and
    using the measured electrical resistance ($R_{EW}$) to determine the meniscus position of the lens.

16. A method as claimed in claim 15, further comprising determining an electrical capacitance ($C_{EW}$) between the first and second electrodes.

17. A method as claimed in claim 15, wherein determining a parameter comprises determining a charging time constant for the lens.

18. A method as claimed in claim 17, wherein determining a parameter comprises determining two charging time constants for the lens, one with and without an additional known resistance ($R_s$), and further determining the lens capacitance ($C_{EW}$) and resistance ($R_{EW}$) from the two time constant measurements.

19. A method as claimed in claim 17, wherein determining a charging time constant comprises driving the lens with an AC voltage.

20. A method as claimed in claim 17, wherein determining a charging time constant comprises driving the lens with the superposition of a DC voltage and a lower voltage square wave AC voltage.

21. A method as claimed in claim 17, wherein determining a charging time constant comprises driving the lens with the superposition of a DC voltage and a lower voltage sinusoidal wave AC voltage and measuring the phase relation between the voltage and the induced current through the lens.

22. A method as claimed in claim 17, wherein the time constant is obtained by a best fit analysis.

23. A method as claimed in claim 17, wherein the time constant is obtained using a look up table.

* * * * *